(12) United States Patent
Parkhideh et al.

(10) Patent No.: US 9,537,319 B2
(45) Date of Patent: Jan. 3, 2017

(54) RECONFIGURABLE POWER SYSTEMS AND CONVERTERS

(75) Inventors: Babak Parkhideh, Morrisville, NC (US); Hongrae Kim, Cary, NC (US)

(73) Assignees: North Carolina State University, Raleigh, NC (US); ABB Research Ltd., Zurich (CH)

( * ) Notice: Subject to any disclaimer, the term of this patent is extended or adjusted under 35 U.S.C. 154(b) by 860 days.

(21) Appl. No.: 13/433,357

(22) Filed: Mar. 29, 2012

(65) Prior Publication Data

US 2012/0261999 A1 Oct. 18, 2012

Related U.S. Application Data (60) Provisional application No. 61/475,983, filed on Apr. 15, 2011.

(51) Int. Cl.

| H02J 4/00 | (2006.01) |
|---|---|
| H02J 3/38 | (2006.01) |
| H02J 7/35 | (2006.01) |
| H02J 3/32 | (2006.01) |

(52) U.S. Cl.
CPC .. *H02J 3/38* (2013.01); *H02J 7/35* (2013.01); *H02J 3/32* (2013.01); *H02J 3/385* (2013.01); *Y02E 10/58* (2013.01); *Y10T 307/696* (2015.04)

(58) Field of Classification Search
CPC ............... H02J 3/38; H02J 7/35; H02J 3/32; H02J 3/385; Y10T 307/696; Y02E 10/58
USPC ...................... 307/80; 363/95, 106
See application file for complete search history.

(56) References Cited

U.S. PATENT DOCUMENTS

| 3,686,867 A | * | 8/1972 | Hull ............................... 60/667 |
|---|---|---|---|
| 4,021,323 A | | 5/1977 | Kilby |
| 4,075,034 A | | 2/1978 | Butler |
| 4,100,051 A | | 7/1978 | Kilby |
| 4,136,436 A | | 1/1979 | Kilby |
| 4,172,740 A | | 10/1979 | Campbell |
| 4,371,135 A | | 2/1983 | Keigler |
| 4,577,471 A | | 3/1986 | Meckler |
| 4,841,416 A | | 6/1989 | Doss |
| 4,982,971 A | | 1/1991 | Marin |
| 5,019,768 A | | 5/1991 | Criswell |

(Continued)

FOREIGN PATENT DOCUMENTS

| CA | 1016998 | 9/1977 |
|---|---|---|
| CA | 2686858 | 2/2009 |

(Continued)

OTHER PUBLICATIONS

Jukka Nurmi, Hongrae Kim, Waqas Arshad, U.S. Appl. No. 61/476,021, filed Apr. 15, 2011.

(Continued)

*Primary Examiner* — Jared Fureman
*Assistant Examiner* — Emmanuel R Dominique
(74) *Attorney, Agent, or Firm* — Taft Stettinius & Hollister LLP (57) ABSTRACT

Reconfigurable power systems and converters and operating methods therefor are disclosed. Reconfigurable power systems may include a DC power source, an electrical energy storage device, an AC power grid connection, and a power converter configured to selectively couple two or more of the DC power source, the electrical energy storage device, and the AC power grid connection.

24 Claims, 8 Drawing Sheets

(56) References Cited

U.S. PATENT DOCUMENTS

| | | | |
|---|---|---|---|
| 5,113,659 A | 5/1992 | Baker | |
| 5,223,781 A | 6/1993 | Criswell | |
| 5,576,533 A | 11/1996 | Tantraporn | |
| 5,806,316 A | 9/1998 | Avakov | |
| 6,057,665 A | 5/2000 | Herniter | |
| 6,088,053 A | 7/2000 | Hammack | |
| 6,088,250 A | 7/2000 | Sirl | |
| 6,239,997 B1 | 5/2001 | Deng | |
| 6,243,277 B1 | 6/2001 | Sun | |
| 6,262,558 B1 | 7/2001 | Weinberg | |
| 6,297,616 B1 | 10/2001 | Kubo | |
| 6,304,006 B1 | 10/2001 | Jungreis | |
| 6,484,069 B2 | 11/2002 | Osinga | |
| 6,487,096 B1* | 11/2002 | Gilbreth | H02J 1/10 363/35 |
| 6,498,290 B1 | 12/2002 | Lawheed | |
| 6,590,793 B1 | 7/2003 | Nagao | |
| 6,672,064 B2 | 1/2004 | Lawheed | |
| 6,676,837 B2 | 1/2004 | Keeton | |
| 6,696,637 B2 | 2/2004 | Lawheed | |
| 6,732,018 B2 | 5/2004 | Osinga | |
| 6,781,335 B2 | 8/2004 | Osinga | |
| 6,837,182 B2 | 1/2005 | Leblanc | |
| 6,914,418 B2 | 7/2005 | Sung | |
| 6,949,843 B2 | 9/2005 | Dubovsky | |
| 6,984,951 B2 | 1/2006 | Osinga | |
| 6,994,155 B2 | 2/2006 | Dessiatoun | |
| 7,072,194 B2 | 7/2006 | Nayar | |
| 7,081,739 B2 | 7/2006 | Osinga | |
| 7,102,251 B2 | 9/2006 | West | |
| 7,184,423 B2 | 2/2007 | Bryan | |
| 7,277,119 B2 | 10/2007 | Hammack | |
| 7,426,329 B2 | 9/2008 | Calhoon | |
| 7,450,406 B2 | 11/2008 | Glauser | |
| 7,456,519 B2* | 11/2008 | Takeda | H02J 9/062 307/64 |
| 7,522,573 B2 | 4/2009 | Bryan | |
| 7,539,029 B2 | 5/2009 | Luerkens | |
| 7,834,580 B2* | 11/2010 | Haines | H02J 7/35 136/247 |
| 7,929,327 B2* | 4/2011 | Haines | H02J 9/062 363/106 |
| 8,106,535 B2* | 1/2012 | Nishimura | H02J 7/35 307/44 |
| 8,493,020 B2* | 7/2013 | Lee | H01M 10/465 307/66 |
| 8,866,334 B2* | 10/2014 | Donnelly | H02J 1/10 290/2 |
| 2003/0164694 A1 | 9/2003 | Moseneder | |
| 2004/0126635 A1* | 7/2004 | Pearson | H01M 8/04089 429/430 |
| 2005/0006958 A1* | 1/2005 | Dubovsky | H02J 3/382 307/64 |
| 2005/0213357 A1* | 9/2005 | Paatero | H02M 5/458 363/95 |
| 2005/0254191 A1* | 11/2005 | Bashaw | H02J 3/383 361/62 |
| 2007/0103108 A1 | 5/2007 | Capp | |
| 2008/0062724 A1* | 3/2008 | Feng | H02J 7/35 363/17 |
| 2008/0094860 A1 | 4/2008 | Falk | |
| 2008/0111517 A1 | 5/2008 | Pfeiffer | |
| 2008/0203820 A1 | 8/2008 | Kramer | |
| 2008/0290838 A1 | 11/2008 | Llonch | 320/137 |
| 2009/0021216 A1* | 1/2009 | Hills | H02J 7/0013 320/134 |
| 2009/0027932 A1* | 1/2009 | Haines | H02J 9/062 363/95 |
| 2009/0236916 A1* | 9/2009 | Nishimura | H02J 7/35 307/80 |
| 2010/0008119 A1 | 1/2010 | O'Brien | |
| 2010/0277132 A1* | 11/2010 | Hara | B60L 11/1864 320/163 |
| 2011/0127837 A1 | 6/2011 | Sato et al. | |
| 2011/0215640 A1* | 9/2011 | Donnelly | H02J 1/10 307/21 |
| 2011/0234177 A1* | 9/2011 | Kohara | H02M 1/36 320/166 |
| 2012/0235481 A1* | 9/2012 | Nakashima | H01M 14/005 307/26 |
| 2013/0307479 A1* | 11/2013 | Kim | H02J 7/007 320/112 |

FOREIGN PATENT DOCUMENTS

| | | | |
|---|---|---|---|
| EP | 2 511 999 | 10/2012 | H02J 3/32 |
| JP | 6178461 A | 6/1994 | |
| JP | 2008-54473 | 3/2008 | H02J 7/35 |
| WO | 02087062 A2 | 10/2002 | |
| WO | 02087062 A3 | 10/2002 | |
| WO | 2007041729 A1 | 4/2007 | |
| WO | 2009155445 * | 12/2009 | |
| WO | WO 2009/155445 A2 | 12/2009 | H03C 3/09 |
| WO | WO 2009/155445 A3 | 12/2009 | H03C 3/09 |
| WO | WO 2009155445 * | 12/2009 | |
| WO | 2010013322 A1 | 2/2010 | |

OTHER PUBLICATIONS

Jukka Nurmi, Hongrae Kim, Waqas Arshad, U.S. Appl. No. 13/417,435, filed Mar. 12, 2012.

"Maximum power point tracker," Wikipedia, The Free Encyclopedia, "http://en.wikipedia.org/wiki/Maximum_power_point_tracker," Jan. 31, 2011.

Japanese Patent Office, Patent Abstracts of Japan, Publication No. 06178461 A, Jun. 24, 1994.

Office Action mailed Oct. 2, 2014 in corresponding U.S. Appl. No. 13/417,435.

Extended EP Search Report mailed Aug. 19, 2014 in corresponding application No. 12161659.3.

EP Office Action mailed Feb. 11, 2014 and Response filed thereto in corresponding application No. 12159377.69.

EP Office Action mailed Oct. 31, 2014 in corresponding application No. 12159377.69.

* cited by examiner

RECONFIGURABLE POWER SYSTEMS AND CONVERTERS

CROSS REFERENCE TO RELATED APPLICATION(S)

This application claims the benefit of and priority to U.S. Provisional Patent Application Ser. No. 61/475,983, which was filed on Apr. 15, 2011 and is entitled "Reconfigurable Power Systems and Converters." The complete disclosure of the above-identified patent application is hereby incorporated by reference for all purposes.

FIELD OF THE DISCLOSURE

The present disclosure relates to power converters and systems, and more particularly to reconfigurable power converters and systems.

BACKGROUND

Examples of solar and electric power converter systems are disclosed in U.S. Pat. Nos. 7,072,194; 6,914,418 and 6,590,793 and in U.S. Patent Application Publication No. 2010/0008119. Examples of battery charging using solar or photovoltaic panels and maximum power point tracking (MPPT) are disclosed in U.S. Pat. Nos. 7,834,580; 6,914,418 and 6,057,665. The disclosures of these and all other publications referenced herein are incorporated by reference in their entirety for all purposes.

SUMMARY

In some examples, reconfigurable power systems may include a DC power source, an electrical energy storage device, an AC power grid connection, and a power converter configured to selectively couple two or more of the DC power source, the electrical energy storage device, and the AC power grid connection.

In some examples, reconfigurable power converters may include a power source connection configured to couple with a DC power source, a storage device connection configured to couple with an electrical energy storage device, a grid connection configured to couple with an AC power grid, and a power converter. The power converter may be configured to selectively couple two or more of the power source connection, the storage device connection, and the grid connection. The power converter may be selectively configured as a DC-DC converter when coupling the power source connection to the storage device connection, a DC-AC inverter when coupling at least one of the power source connection and the storage device connection to the grid connection, and an AC-DC converter when coupling the grid connection to the storage device connection.

In some examples, methods of operating reconfigurable power converters, which may be configured to selectively couple two or more of a DC power source, an electrical energy storage device, and an AC power grid connection, may include configuring the power converter as a DC-DC converter and coupling the DC power source to the electrical energy storage device, configuring the power converter as a DC-AC inverter and coupling the DC power source and the electrical energy storage device to the AC power grid connection, and configuring the power converter as a DC-AC inverter and coupling the electrical energy storage device to the AC power grid connection.

DETAILED DESCRIPTION

Figure 1:
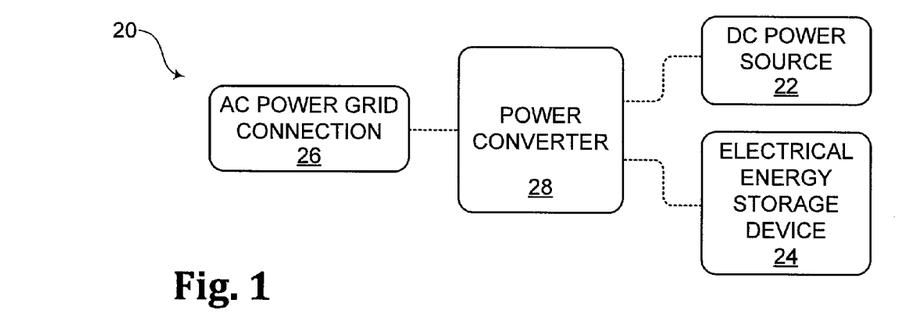
FIG. 1 is a block diagram of a nonexclusive illustrative example of a reconfigurable power system.

A nonexclusive illustrative example of a reconfigurable power system is shown generally at 20 in FIG. 1. Unless otherwise specified, the reconfigurable power system 20 may, but is not required to, contain at least one of the structures, components, functionalities, and/or variations described, illustrated, and/or incorporated herein. In the illustrated example, the power system 20 includes a DC power source 22, an electrical energy storage device 24, a connection to an AC power grid or an AC power grid connection 26, and a power converter 28.

The DC power source 22 may include any DC source, such as an intermittent or non-base load source. For example, the DC power source may include at least one solar or photovoltaic (PV) cell. In some examples, at least a portion of the DC source may include other intermittent power sources such as wind or tidal power, although some possible intermittent power sources, such as wind and tidal power, may need to be converted to DC before use with the reconfigurable power system 20.

The electrical energy storage device 24 may include any suitable combination of devices or structures capable of storing electrical energy. Nonexclusive illustrative examples of such devices include, without limitation, electrochemical cells or batteries, capacitors, supercapacitors, flywheels, or the like.

The power converter 28 may include at least one switching element or device. The switching element or device may include at least one semiconductor switching device, such as a power transistor, a power MOSFET, an insulated gate bipolar transistor (IGBT), a gate turn-off thyristor (GTO), or the like. By changing the on-off duty ratio and frequency of the switching element or device, the power converter 28 can control its output voltage and frequency.

The power converter 28 may be configured to selectively couple two or more of the DC power source 22, the electrical energy storage device 24, and the AC power grid connection 26.

The power converter 28 may be configured to operate in a selected one of at least three modes. For example, the power converter 28 may be configured to selectively operate or function as a DC-AC inverter, a DC-DC converter, or an AC-DC converter. For example, the power converter 28 may be configured to function as a DC-AC inverter when coupling the DC power source 22 and/or the electrical energy storage device 24 to the AC power grid connection 26, such as to deliver power from the DC power source, the electrical energy storage device, or both to the AC power grid. The power converter 28 may be configured to function as a DC-DC converter when coupling the DC power source 22 to the electrical energy storage device 24, such as to charge the electrical energy storage device. The power converter 28 may be configured to function as an AC-DC converter when coupling the AC power grid connection 26 to the electrical energy storage device 24, such as to charge the electrical energy storage device from the AC power grid.

Figure 2:
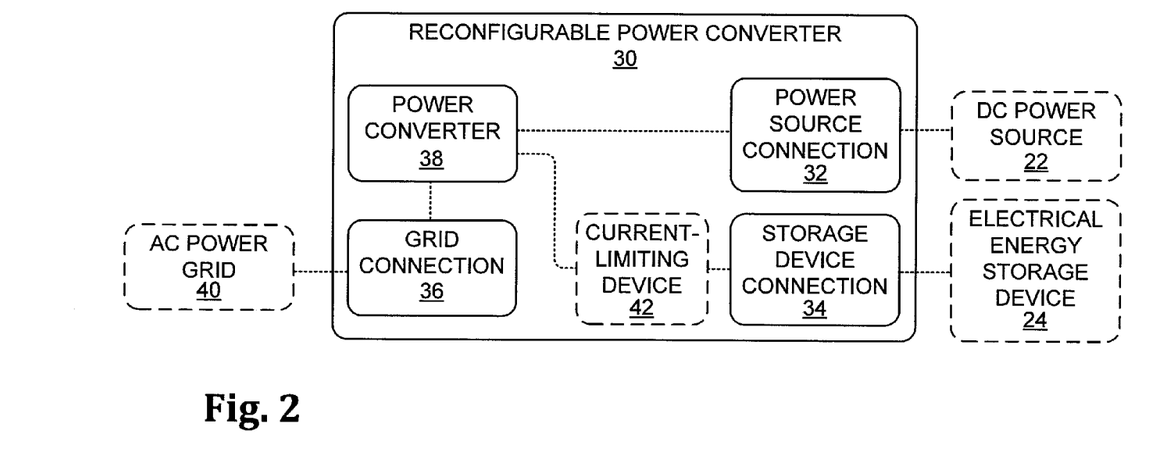
FIG. 2 is a block diagram of a nonexclusive illustrative example of a reconfigurable power converter.

A nonexclusive illustrative example of a reconfigurable power converter is shown generally at 30 in FIG. 2. Unless otherwise specified, the reconfigurable power converter 30 may, but is not required to, contain at least one of the structures, components, functionalities, and/or variations described, illustrated, and/or incorporated herein. In the illustrated example, the reconfigurable power converter 30 includes a power source connection 32, a storage device connection 34, a grid connection 36 and a power converter 38. The power source connection 32 may be configured to couple with a DC power source 22, the storage device connection 34 may be configured to couple with an electrical energy storage device 24, and the grid connection 36 may be configured to couple with an AC power grid 40.

The power converter 38, which may include at least one semiconductor switching device, may be configured to selectively couple two or more of the power source connection 32, the storage device connection 34, and the grid connection 36. The power converter may be selectively configured as, for example, a DC-DC converter, a DC-AC inverter or an AC-DC converter. For example, when coupling the power source connection 32 to the storage device connection 34, the power converter 38 may be configured as a DC-DC converter. When coupling the grid connection 36 to at least one of the power source connection 32 and the storage device connection 34, the power converter 38 may be configured as a DC-AC inverter. When coupling the grid connection 36 to the storage device connection 34, the power converter may be configured as an AC-DC converter.

In some examples, the reconfigurable power converter 30 may include a current-limiting structure or device 42, such as a resistor. The current-limiting structure or device 42 may be configured to selectively limit inrush current to an electrical energy storage device 24 that is coupled with the storage device connection 34.

Figure 3:
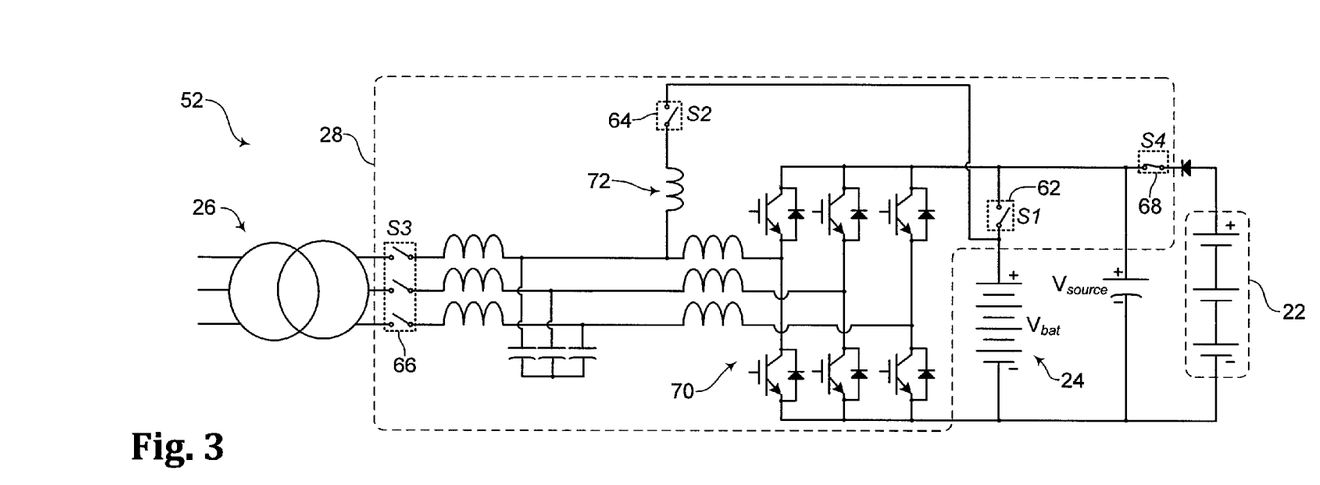
FIG. 3 is a schematic diagram of a nonexclusive illustrative example of a 3-phase asymmetric reconfigurable power system.
Figure 4:
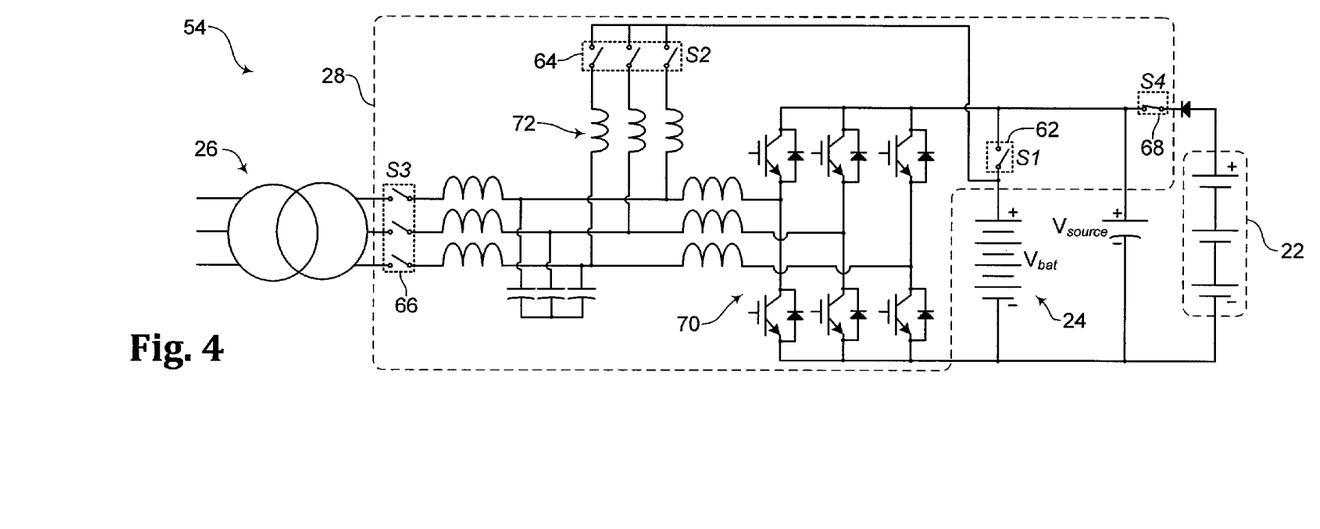
FIG. 4 is a schematic diagram of a nonexclusive illustrative example of a 3-phase symmetric reconfigurable power system.
Figure 5:
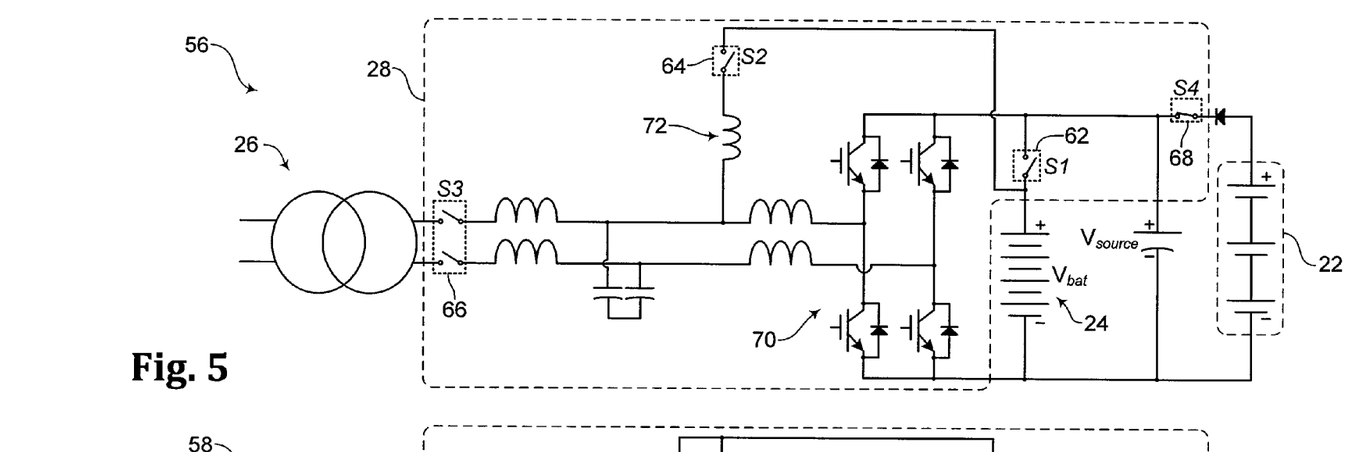
FIG. 5 is a schematic diagram of a nonexclusive illustrative example of a single-phase asymmetric reconfigurable power system.
Figure 6:
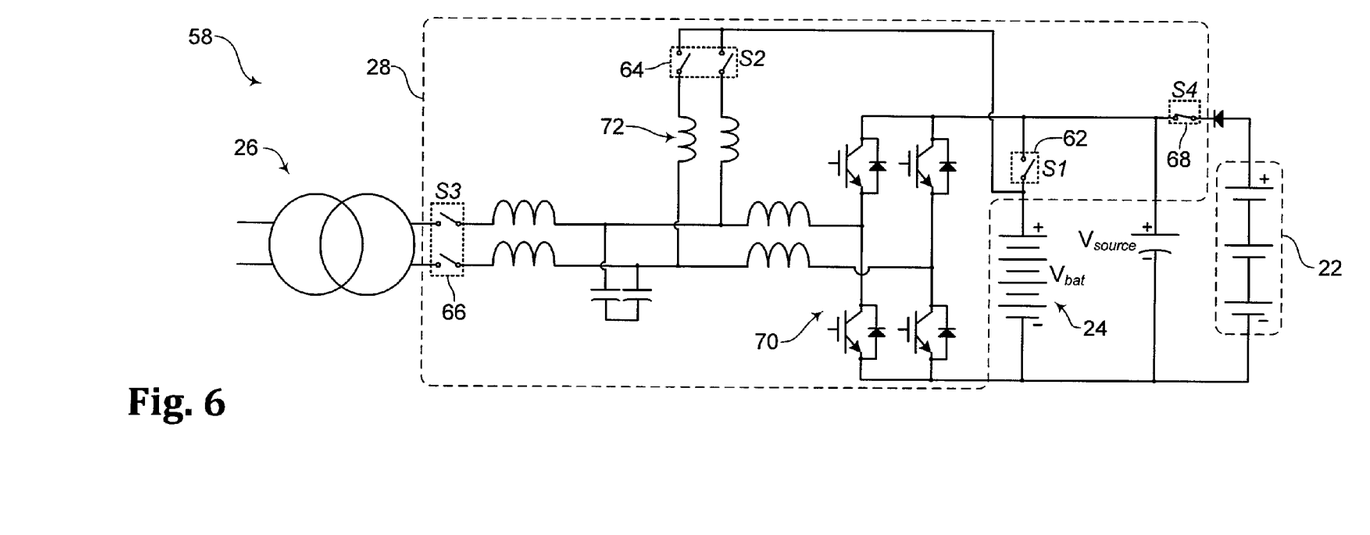
FIG. 6 is a schematic diagram of a nonexclusive illustrative example of a single-phase symmetric reconfigurable power system.

FIGS. 3-6 illustrate further nonexclusive illustrative examples of reconfigurable power systems. A 3-phase asymmetric reconfigurable power system 52 is shown in FIG. 3, a 3-phase symmetric reconfigurable power system 54 is shown in FIG. 4, a single-phase asymmetric reconfigurable power system 56 is shown in FIG. 5, and a single-phase symmetric reconfigurable power system 58 is shown in FIG. 6. Unless otherwise specified, the reconfigurable power systems 52, 54, 56, 58 may, but are not required to, contain at least one of the structures, components, functionalities, and/or variations described, illustrated, and/or incorporated herein. In the illustrated examples, each of the reconfigurable power systems 52, 54, 56, 58 includes a DC power source 22, an electrical energy storage device 24, an AC power grid connection 26, and a power converter 28 with a plurality of converter circuits 70.

As shown in FIGS. 3-6, the power converters 28 of the reconfigurable power systems 52 may include a plurality of switches 62, 64, 66, 68. In some examples, the power converters 28 may optionally include at least one inductor 72 on the circuit path used to charge the electrical energy storage device 24 from the DC power source 22, as will be set out below.

With regard to the asymmetric and symmetric configurations of the reconfigurable power systems 52, 54, 56, 58 of FIGS. 3-6, the asymmetric configuration may permit a reduction in manufacturing cost and/or physical size of the power converter. For example, the wiring would be simplified, the switch 64 would only need to be a single switch, and only a single inductor 72 would be needed. However, the symmetric configuration may permit more efficient utilization of the converter circuits 70 within the power converter and/or equalize the losses across all of the converter circuits 70, such as by equalizing the losses on the semiconductor switches in the power converter when using the DC power source to charge the battery, as will be set out below.

Another nonexclusive illustrative example of a reconfigurable power system is shown generally at 76 in FIGS. 7-12. Unless otherwise specified, the reconfigurable power system 76 may, but is not required to, contain at least one of the structures, components, functionalities, and/or variations described, illustrated, and/or incorporated herein. As shown, the reconfigurable power system 76 includes a DC power source 22, an electrical energy storage device 24, an AC power grid connection 26, and a power converter 28. As shown in FIGS. 7-12, the DC power source 22 of the reconfigurable power system 76 includes a plurality of photovoltaic cells 78, and the electrical energy storage device 24 includes a battery.

The various operating modes or configurations of a reconfigurable power system and/or power converter may be explained more fully with reference to the reconfigurable power system 76 and the power converter 28 illustrated in FIGS. 7-12.

Figure 7:
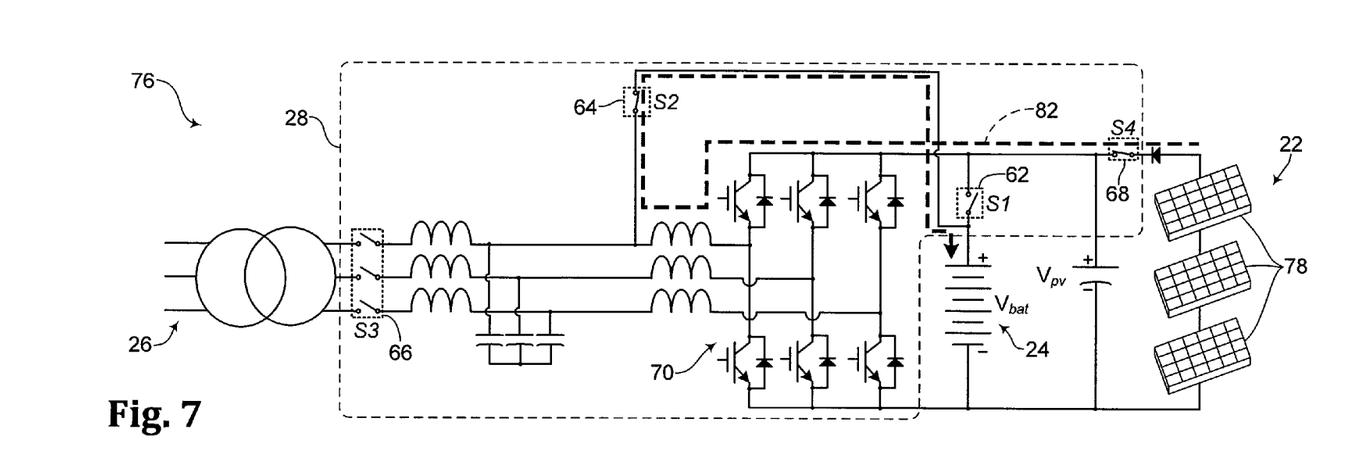
FIG. 7 is a schematic diagram of another nonexclusive illustrative example of a 3-phase asymmetric reconfigurable power system, shown with the power converter connecting a photovoltaic DC power source to an electrical energy storage device.

In the mode illustrated in FIG. 7, the switches 64, 68 are closed, while the switches 62, 66 are open, such that the power converter 28 of the reconfigurable power system 76 is coupling the plurality of photovoltaic cells 78 of the DC power source 22 to the electrical energy storage device 24, with a power flow as generally suggested by the arrow 82. In this mode, the power converter 28 is configured to function as a DC-DC converter such that the photovoltaic cells 78 charge the electrical energy storage device 24.

In some examples where the reconfigurable power system 76 is operating in the mode illustrated in FIG. 7, the power converter 28 may perform maximum power point tracking (MPPT) with the photovoltaic cells 78. Under maximum power point tracking, the power converter 28 attempts to function as a substantially optimal electrical load for the photovoltaic cells in order to extract a relatively high level of power from the photovoltaic cells. In some examples, the level of power extracted from the photovoltaic cells during maximum power point tracking may be near the maximum or even the maximum power available from the photovoltaic cells.

Figure 8:
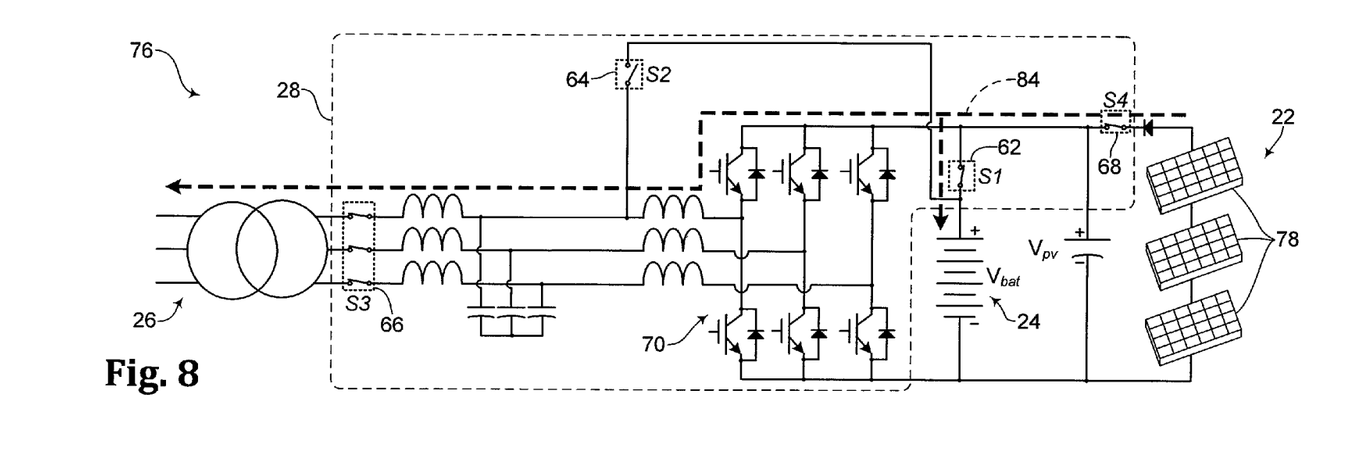
FIG. 8 is a schematic diagram of the reconfigurable power system of FIG. 7, shown with the power converter connecting the photovoltaic DC power source to the AC power grid and the electrical energy storage device.

In the mode illustrated in FIG. 8, the switches 62, 66, 68 are closed, while the switch 64 is open, such that the power converter 28 of the reconfigurable power system 76 is coupling the plurality of photovoltaic cells 78 to the electrical energy storage device 24 and to the AC power grid connection 26. In this mode, the power converter 28 is configured to function as a DC-AC inverter such that the photovoltaic cells 78 deliver power to the AC power grid and charge the electrical energy storage device 24, with a power flow as generally suggested by the arrow 84.

Figure 9:
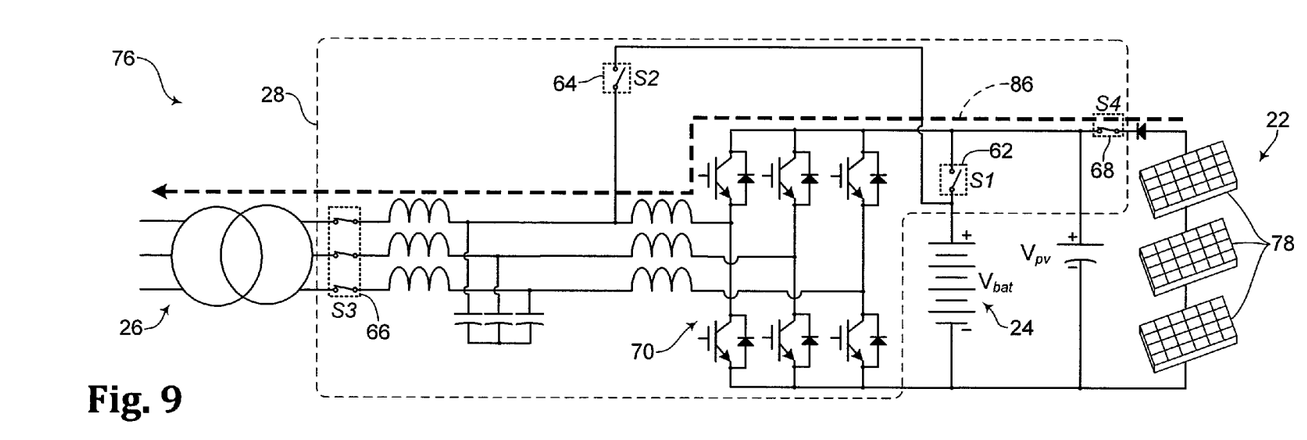
FIG. 9 is a schematic diagram of the reconfigurable power system of FIG. 7, shown with the power converter connecting the photovoltaic DC power source to the AC power grid.

In the mode illustrated in FIG. 9, the switches 66, 68 are closed, while the switches 62, 64 are open, such that the power converter 28 of the reconfigurable power system 76 is coupling the plurality of photovoltaic cells 78 to the AC power grid connection 26. In this mode, the power converter 28 is configured to function as a DC-AC inverter such that the photovoltaic cells 78 deliver power to the AC power grid, with a power flow as generally suggested by the arrow 86. In some examples where the reconfigurable power system 76 is operating in the mode illustrated in FIG. 9, the power converter 28 may perform maximum power point tracking with the photovoltaic cells 78.

Figure 10:
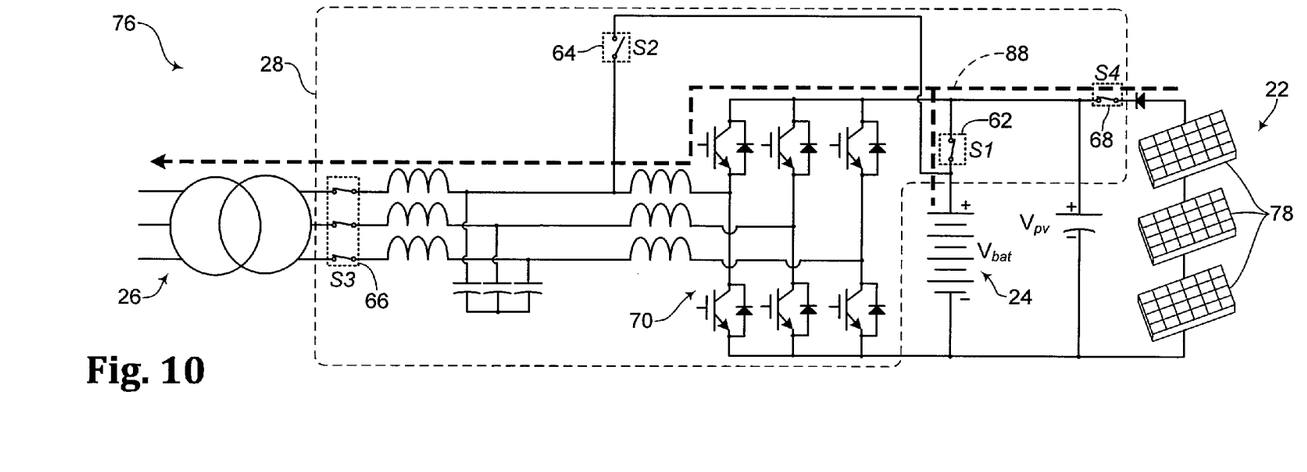
FIG. 10 is a schematic diagram of the reconfigurable power system of FIG. 7, shown with the power converter connecting the photovoltaic DC power source and the electrical energy storage device to the AC power grid.

In the mode illustrated in FIG. 10, the switches 62, 66, 68 are closed, while the switch 64 is open, such that the power converter 28 of the reconfigurable power system 76 is coupling the plurality of photovoltaic cells 78 and the electrical energy storage device 24 to the AC power grid connection 26. In this mode, the power converter 28 is configured to function as a DC-AC inverter such that the photovoltaic cells 78 and the electrical energy storage device 24 both deliver power to the AC power grid, with a power flow as generally suggested by the arrow 88.

Figure 11:
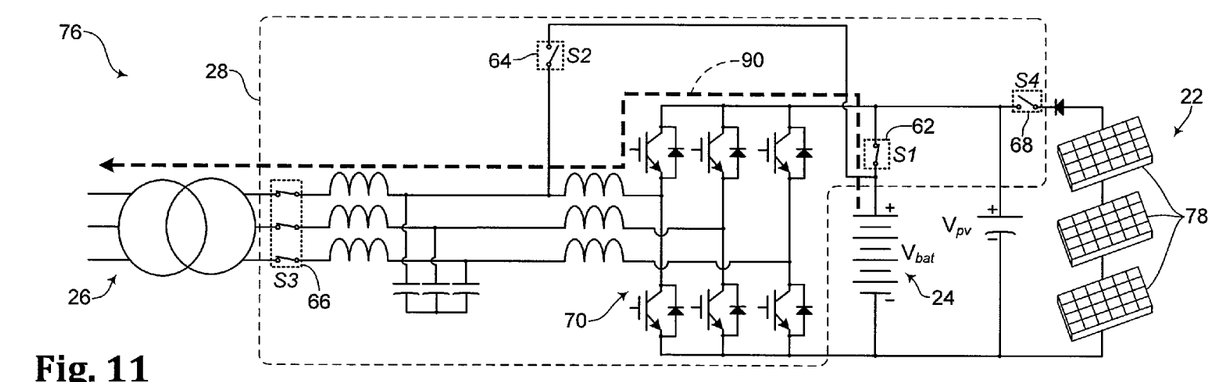
FIG. 11 is a schematic diagram of the reconfigurable power system of FIG. 7, shown with the power converter connecting the electrical energy storage device to the AC power grid.

In the mode illustrated in FIG. 11, the switches 62, 66 are closed, while the switches 64, 68 are open, such that the power converter 28 of the reconfigurable power system 76 is coupling the electrical energy storage device 24 to the AC power grid connection 26. In this mode, the power converter 28 is configured to function as a DC-AC inverter such that the electrical energy storage device 24 delivers power to the AC power grid, with a power flow as generally suggested by the arrow 90.

Figure 12:
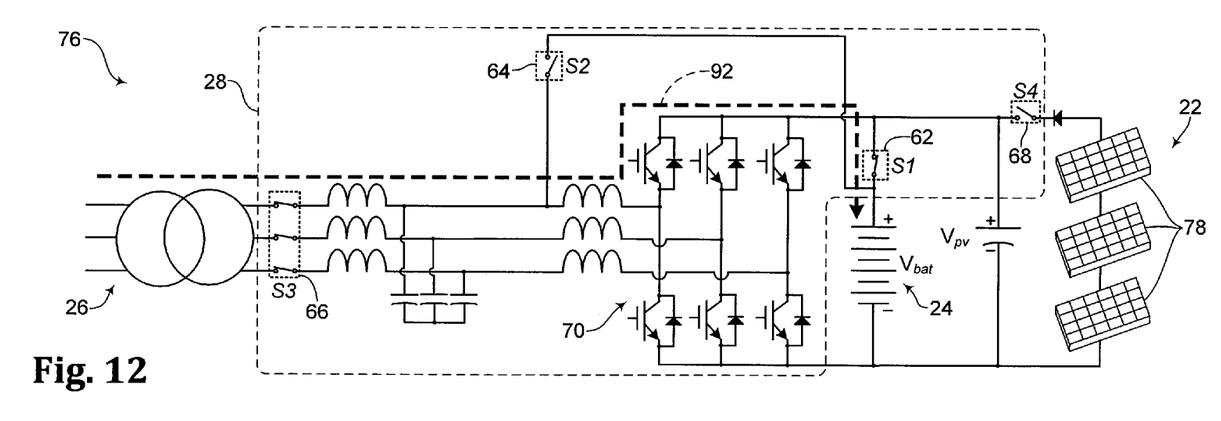
FIG. 12 is a schematic diagram of the reconfigurable power system of FIG. 7, shown with the power converter connecting the AC power grid to the electrical energy storage device.

In the mode illustrated in FIG. 12, the switches 62, 66 are closed, while the switches 64, 68 are open, such that the power converter 28 of the reconfigurable power system 76 is coupling the electrical energy storage device 24 to the AC power grid connection 26. In this mode, the power converter 28 is configured to function as an AC-DC converter such that the electrical energy storage device 24 is charged from the AC power grid, with a power flow as generally suggested by the arrow 92.

in some examples, peak hourly grid load demand and/or peak power consumption may generally occur, between about 4:00 PM (16:00) and about 8:00 PM (20:00). However, peak photovoltaic (PV) power generation may generally occur, for example, between about 11:00 AM (11:00) and about 3:00 PM (15:00). Thus, in some examples, hourly grid load demand may not match well with purely photovoltaic power generation or photovoltaic power generation without electrical energy storage. However, if photovoltaic power generation is combined with electrical energy storage, such as where a power system includes both photovoltaic cells and electrical energy storage devices, a better match to the grid load demand may be realized. In particular, photovoltaic energy generated before the hours of peak grid load demand can be stored in a suitable electrical energy storage device and then used during the hours of peak grid load demand.

The following paragraphs describe nonexclusive illustrative examples of methods of operating reconfigurable power converters using the concepts and components disclosed herein. Although the actions of the disclosed methods may be performed in the order in which they are presented below, it is within the scope of this disclosure for the actions, either alone or in various combinations, to be performed before and/or after any of the other actions.

When used as part of a power system, the reconfigurable power converters and reconfigurable power systems may be used in any combination of modes suitable to supply the power to the load demand at a given time of day. For example, the reconfigurable power system 76 of FIGS. 7-12 may be sequentially operated in the modes illustrated in respective ones of FIGS. 7-12 over the course of a normal day.

Figure 13:
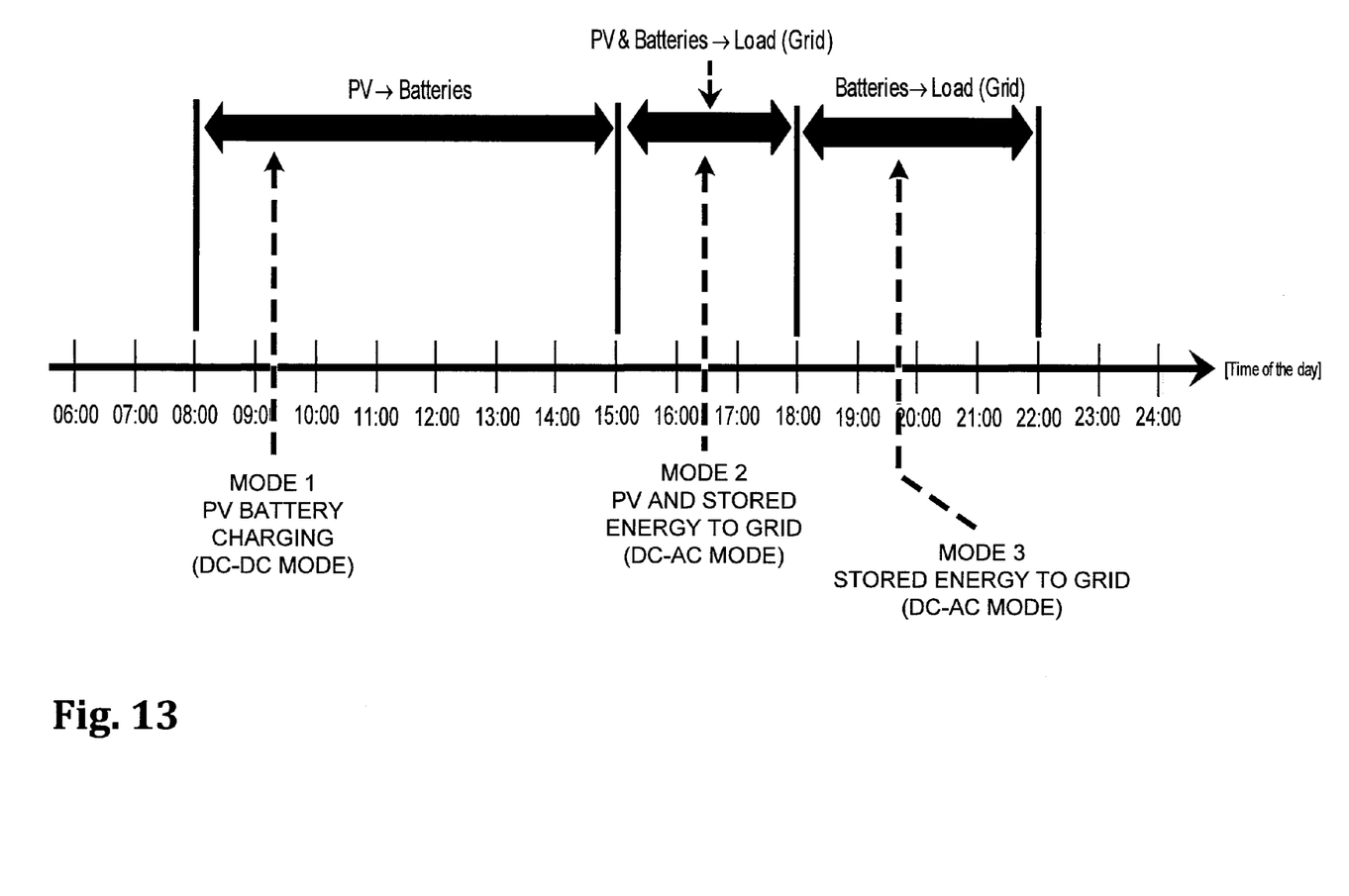
FIG. 13 is a daily timeline illustrating a nonexclusive illustrative implementation example, which may be suitable for one of the reconfigurable power systems and/or converters disclosed herein.

With reference to FIG. 13, a nonexclusive illustrative example of a method of operating a reconfigurable power converter may include three sequential modes of operation: MODE 1, MODE 2, and MODE 3. In MODE 1, the power converter may be configured as a DC-DC converter that couples a DC power source, which may include at least one photovoltaic or solar cell, to an electrical energy storage device to charge the electrical energy storage device, which may include a battery. The reconfigurable power converter may be operated in MODE 1 between, for example, about 8:00 AM (08:00) and about 3:00 PM (15:00), which may include the times of day that provide relatively high and/or peak photovoltaic power generation, but are before the hours of peak grid load demand. In MODE 2, the power converter may be configured as a DC-AC inverter that couples the DC power source and the electrical energy storage device to the AC power grid such that power is delivered to the AC power grid from both the DC power source and the energy stored in the electrical energy storage device. The reconfigurable power converter may be operated in MODE 2 between, for example, about 3:00 PM (15:00) and about 6:00 PM (18:00), which may include the times of day during which peak grid load demand occurs and during which photovoltaic power generation is still available. In MODE 3, the power converter may be configured as a DC-AC inverter that couples the electrical energy storage device to the AC power grid to deliver stored energy to the grid. The reconfigurable power converter may be operated in MODE 3 between, for example, about 6:00 PM (18:00) and about 10:00 PM (22:00), which may include the times of day where photovoltaic power generation may not be available but the grid load demand is still high enough to warrant delivering stored energy from the energy storage device to the AC power grid.

In some examples, the power converter may perform maximum power point tracking for at least one solar cell when the power converter is configured as a DC-DC converter that couples the DC power source to the electrical energy storage device. Thus, in MODE 1, the power converter may perform maximum power point tracking while charging a battery from a photovoltaic cell.

In some examples, methods of operating reconfigurable power converters may include configuring the power converter as a DC-AC inverter and coupling the DC power source, but not the electrical energy storage device, to the AC power grid. In such examples, the power converter may perform maximum power point tracking for at least one solar cell when the power converter is configured as a DC-AC inverter that couples the DC power source to the AC power grid.

In some examples, methods of operating reconfigurable power converters may include configuring the power converter as an AC-DC converter and coupling the AC power grid to the electrical energy storage device. In such an example, power may be drawn from the AC power grid to charge the electrical energy storage device, such as during hours of low grid load demand.

In some examples, a capacitor may be connected in parallel with the electrical energy storage device. In such examples, the methods of operating reconfigurable power converters, such as when transitioning from the MODE 1 to the MODE 2 discussed above, may include uncoupling the DC power source from the electrical energy storage device, equalizing a voltage of the electrical energy storage device to a voltage of the capacitor, and then configuring the power converter as a DC-AC inverter and coupling the DC power source and the electrical energy storage device to the AC power grid after equalizing the voltage of the electrical energy storage device to the voltage of the capacitor. Equalizing the voltage of the electrical energy storage device to the voltage of the capacitor may reduce or prevent potentially large inrush currents that may otherwise flow into the electrical energy storage device from the capacitor when the DC power source is connected to the electrical energy storage device, such as during a transition or change from MODE 1 to MODE 2. Reducing or preventing large inrush currents into the electrical energy storage device may reduce or prevent damage to the electrical energy storage device and/or improve its lifetime.

In some examples, equalizing the voltage of the electrical energy storage device to the voltage of the capacitor may include connecting the electrical energy storage device to the capacitor through a current-limiting device, such as a resistor, which may limit the current flowing into the electrical energy storage device until the voltage levels are equalized. Such an example may be further explained with reference to the nonexclusive illustrative example of a reconfigurable power system shown generally at 96 in FIG. 14. Unless otherwise specified, the reconfigurable power system 96 may, but is not required to, contain at least one of the structures, components, functionalities, and/or variations described, illustrated, and/or incorporated herein. As shown, the reconfigurable power system 96 includes a DC power source 22 having a plurality of photovoltaic cells 78, an electrical energy storage device 24 that includes a battery, an AC power grid connection 26, a power converter 28, a capacitor 98 connected in parallel with the electrical energy storage device 24 and the DC power source 22, a resistor 100, and a plurality of switches 62, 64, 66, 68, 102 and 104.

Figure 14:
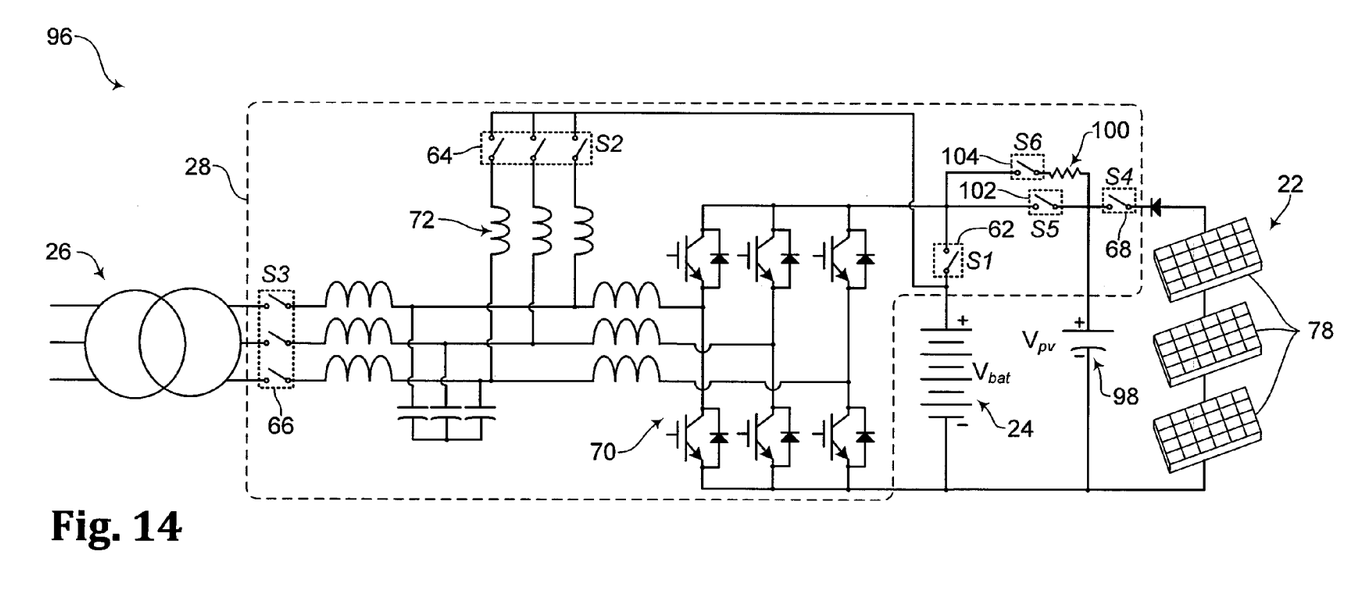
FIG. 14 is a schematic diagram of another nonexclusive illustrative example of a 3-phase symmetric reconfigurable power system.

In MODE 1 the power converter 28 would be configured similarly to FIG. 7, with the switches 62, 66 open and the switches 64, 68, 102 closed to couple the DC power source 22 to the electrical energy storage device 24. In MODE 2 the power converter 28 would be configured similarly to FIG. 10, with the switch 64 open and the switches 62, 66, 68, 102 closed to couple the DC power source 22 and the electrical energy storage device 24 to the AC power grid connection 26. When transitioning the reconfigurable power system 96 from MODE 1 to MODE 2, the switch 102 may be opened and the switch 104 may then be closed to selectively series-couple the electrical energy storage device 24 to the capacitor 98 through the resistor 100 to equalize the voltage, $v_{bat}$, of the electrical energy storage device 24 to the voltage, $v_{pv}$, of the capacitor 98 prior to opening the switch 104 and closing switches 102 and 66 to couple the DC power source 22 and the electrical energy storage device 24 to the AC power grid connection 26, with the switch 64 being opened before closing the switch 66.

When transitioning the reconfigurable power system 96 from the MODE 2 to the MODE 3 discussed above, the switch 102 need only be opened. However, operation of the power converter 28 and/or its converter circuits 70 may be discontinued while opening the switch 102, which may prevent or reduce transient performance.

The methods disclosed herein may be embodied as or take the form of the methods described herein, as well as of a transitory or non-transitory computer readable medium having a plurality of machine- or computer-readable instructions stored thereon that, when executed by a processor, carry out operations of the disclosed methods and systems. The computer-readable medium may be any medium that can contain, store, communicate, propagate, or transport the program instruction for use by or in connection with the instruction execution system, apparatus, or device and may, by way of example but without limitation, be an electronic, magnetic, optical, electromagnetic, infrared, or semiconductor system, apparatus, device, or propagation medium or other suitable medium upon which the program is recorded. More specific examples (a non-exhaustive list) of such a computer-readable medium may include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the disclosed methods and systems may be written in any suitable programming language provided it allows achieving the previously described technical results. The instructions may be configured for execution on any system, apparatus or device having sufficient processing power and access to any required data.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A reconfigurable power system, comprising:
a DC power source;
an electrical energy storage device;
an AC power grid connection; and
a power converter comprising:
 a plurality of switching devices,
 a first switch interposed between said electrical energy storage device and said plurality of switching devices,
 a second switch interposed between said electrical energy storage device and said AC power grid connection,
 a third switch interposed between said AC power grid connection and said plurality of switching devices, and
 a fourth switch interposed between said DC power source and said plurality of switching devices,
 said power converter configured to
selectively couple the DC power source to the electrical energy storage device by closing said fourth switch and maintaining either: said first switch in an open position and said second switch in a closed position; or said first switch in a closed position and said second switch in an open position,
selectively couple the DC power source to the AC power grid connection by maintaining said second switch in an open position, and said third and fourth switches in a closed position, and
selectively couple the electrical energy storage device to the AC power grid connection by maintaining said first and third switches in a closed position,
and wherein the power converter is further configured to:
(1) deliver, during a first time period, power from the DC power source to the electrical energy source but not to the AC power grid connection, the first time period including at least a portion of time in which power outputted by the DC power source is around a power source peak level and a grid demand level of an external AC power grid that is coupled to the reconfigurable power system via the AC power grid connection is below a peak demand level;
(2) deliver, during a second time period, power from the DC power source and the electrical energy source to at least the AC power grid connection, the second time period including at least a portion of time in which the grid demand level is around the peak demand level; and
(3) deliver, during a third time period, power from the electrical energy storage device to the AC power grid connection, the third time period including at least a portion of time in which the power outputted by the DC power source is less than the source peak level and the grid demand level is below the peak demand level.

2. The reconfigurable power system of claim 1, wherein the DC power source includes at least one solar cell.

3. The reconfigurable power system of claim 1, wherein the electrical energy storage device includes a battery.

4. The reconfigurable power system of claim 1, wherein said plurality of switching devices includes at least one semiconductor switching device selected from the group consisting of a power transistor, a power MOSFET, an insulated gate bipolar transistor and a gate turn-off thyristor.

5. The reconfigurable power system of claim 1, wherein said plurality of switching devices are configured to selectively function as a DC-AC inverter, a DC-DC converter, or an AC-DC converter.

6. The reconfigurable power system of claim 5, wherein said plurality of switching devices are configured to function as the DC-AC inverter when coupling at least one of the DC power source and the electrical energy storage device to the AC power grid connection to deliver power from at least one of the DC power source and the electrical energy storage device to an AC power grid.

7. The reconfigurable power system of claim 5, wherein said plurality of switching devices are configured to function as the DC-DC converter when coupling the DC power source to the electrical energy storage device to charge the electrical energy storage device.

8. The reconfigurable power system of claim 5, wherein said plurality of switching devices are configured to function as the AC-DC converter when coupling the AC power grid connection to the electrical energy storage device to charge the electrical energy storage device.

9. The reconfigurable power system of claim 1, wherein:
the reconfigurable power system is configured to operate in a selected one of at least three modes;
in a first one of the modes said plurality of switching devices are configured as a DC-DC converter coupling the DC power source to the electrical energy storage device;
in a second one of the modes said plurality of switching devices are configured as a DC-AC inverter coupling at least one of the DC power source and the electrical energy storage device to the AC power grid connection; and
in a third one of the modes said plurality of switching devices are configured as an AC-DC converter coupling the AC power grid connection to the electrical energy storage device.

10. The reconfigurable power system of claim 1, wherein:
the reconfigurable power system is configured to operate in a selected one of at least three modes;
in a first one of the modes said plurality of switching devices are configured as a DC-DC converter coupling the DC power source to the electrical energy storage device;
in a second one said plurality of switching devices are configured as a DC-AC inverter coupling the DC power source and the electrical energy storage device to the AC power grid connection; and
in a third one of the modes said plurality of switching devices are configured as a DC-AC inverter coupling the electrical energy storage device to the AC power grid connection.

11. The reconfigurable power system of claim 10, where in a fourth one of the at least three modes said plurality of switching devices are configured as a DC-AC inverter coupling the DC power source to the AC power grid connection.

12. The reconfigurable power system of claim 10, comprising:
a capacitor connected in parallel with the electrical energy storage device and the DC power source; and
a resistor configured to selectively series-couple the electrical energy storage device to the capacitor.

13. A reconfigurable power converter, comprising:
a power source connection configured to couple with a DC power source;
a storage device connection configured to couple with an electrical energy storage device;
a grid connection configured to couple with an AC power grid; and
a power converter comprising a plurality of switching devices and a plurality of switches, said plurality of switches are selectively interposed between said plurality of switching devices and said power source connection, said storage device connection and said grid connection, said power converter configured to selectively couple two or more of the power source connection, the storage device connection, and the grid connection, wherein the power converter is selectively configured as one of:
a DC-DC converter when coupling the power source connection to the storage device connection, but not to the grid connection, by closing selected switches in said plurality of switches and routing, during a first time period, power from said DC power source through said selected switches that are closed and said plurality of switching devices to said electrical energy storage device, said first time period including at least a portion of time in which power outputted by the DC power source is around a power source peak level and a grid demand level of an external AC power grid that is coupled to the reconfigurable power system via the grid connection is below a peak demand level;
a DC-AC inverter when coupling, during a second time period, at least one of the power source connection and the storage device connection to the grid connection by closing selected switches in said plurality of switches and routing power from one of said DC power source and said electrical energy storage device through said selected switches that are closed and said plurality of switching devices to said AC power grid, the second time period including at least a portion of time in which the grid demand level is around the peak demand level; and
an AC-DC converter when coupling, during a third time period, the grid connection to the storage device connection by closing selected switches in said plurality of switches and routing power from said AC power grid through said selected switches that are closed and said plurality of switching devices to said electrical energy storage device.

14. The reconfigurable power converter of claim 13, wherein the DC power source includes at least one solar cell.

15. The reconfigurable power converter of claim 13, wherein the electrical energy storage device includes a battery.

16. The reconfigurable power converter of claim 13, wherein said plurality of switching devices includes at least one semiconductor switching device.

17. The reconfigurable power converter of claim 13, comprising a resistor configured to selectively limit inrush current to an electrical energy storage device coupled with the storage device connection.

18. A method of operating a reconfigurable power converter configured to selectively couple two or more of a DC power source, an electrical energy storage device, and an AC power grid connection, wherein the power converter comprises a plurality of switching devices and a plurality of switches interposed between the DC power source, the electrical energy storage device, and the AC power grid connection, and the method comprises:
configuring, during a first time period, the power converter as a DC-DC converter and coupling the DC power source to the electrical energy storage device by closing selected switches in said plurality of switches and routing power from said DC power source through said selected switches that are closed and said plurality of switching devices to said electrical energy storage device, the first time period including at least a portion of time in which power outputted by the DC power source is around a power source peak level and a grid demand level of an external AC power grid that is coupled to the reconfigurable power system via the AC power grid connection is below a peak demand level;
configuring, during a second time period, the power converter as a DC-AC inverter and coupling at least one of the DC power source and the electrical energy storage device to the AC power grid connection by closing selected switches in said plurality of switches and routing power from one of said DC power source and said electrical energy storage device through said selected switches that are closed and said plurality of switching devices to said AC power grid connection, the second time period including at least a portion of time in which the grid demand level is around the peak demand level; and
configuring, during a third time period, the power converter as a DC-AC inverter and coupling the electrical energy storage device to the AC power grid connection by closing selected switches in said plurality of switches and routing power from said electrical energy storage device through said selected switches that are closed and said plurality of switching devices to said AC power grid connection, the third time period including at least a portion of time in which the power outputted by the DC power source is less than the source peak level and the grid demand level is below the peak demand level.

19. The method of claim 18, wherein the DC power source includes at least one solar cell.

20. The method of claim 19, wherein the power converter performs maximum power point tracking for the at least one solar cell when the power converter is configured as a DC-DC converter that couples the DC power source to the electrical energy storage device.

21. The method of claim 19, comprising configuring the power converter as a DC-AC inverter and coupling the DC power source to the AC power grid connection, wherein the power converter performs maximum power point tracking for the at least one solar cell when the power converter is configured as a DC-AC inverter that couples the DC power source to the AC power grid connection.

22. The method of claim 18, comprising configuring the power converter as an AC-DC converter and coupling the AC power grid connection to the electrical energy storage device by closing selected switches in said plurality of switches and routing power from said AC power grid connection through said selected switches that are closed and said plurality of switching devices to said electrical energy storage device.

23. The method of claim 18, wherein a capacitor is connected in parallel with the electrical energy storage device, the method comprising:
- uncoupling the DC power source from the electrical energy storage device;
- equalizing a voltage of the electrical energy storage device to a voltage of the capacitor; and
- configuring the power converter as a DC-AC inverter and coupling the DC power source and the electrical energy storage device to the AC power grid connection after equalizing the voltage of the electrical energy storage device to the voltage of the capacitor.

24. The method of claim 23, where equalizing the voltage of the electrical energy storage device to the voltage of the capacitor comprises connecting the electrical energy storage device to the capacitor through a resistor.

\* \* \* \* \*